(12) United States Patent
Rozman et al.

(10) Patent No.: US 8,390,151 B2
(45) Date of Patent: Mar. 5, 2013

(54) SSPC WITH ACTIVE CURRENT LIMITING

(75) Inventors: Gregory I. Rozman, Rockford, IL (US);
Vietson M. Nguyen, Rockford, IL (US);
Josh C. Swenson, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 353 days.

(21) Appl. No.: 12/720,703

(22) Filed: Mar. 10, 2010

(65) Prior Publication Data
US 2011/0221404 A1 Sep. 15, 2011

(51) Int. Cl.
*H01H 9/54* (2006.01)
(52) U.S. Cl. ........................................ 307/140
(58) Field of Classification Search .................... 307/140
See application file for complete search history.

(56) References Cited

U.S. PATENT DOCUMENTS

| | | | |
|---|---|---|---|
| 4,490,769 A | 12/1984 | Boenig | |
| 4,644,438 A | 2/1987 | Puccinelli | |
| 4,700,256 A | 10/1987 | Howell | |
| 4,733,321 A | 3/1988 | Lindeperg | |
| 5,550,702 A * | 8/1996 | Schmidt et al. | 361/103 |
| 5,654,859 A | 8/1997 | Shi | |
| 6,246,559 B1 | 6/2001 | Sanders et al. | |
| 6,768,350 B1 | 7/2004 | Dickey | |
| 7,453,678 B2 | 11/2008 | Beneditz et al. | |
| 7,489,490 B2 | 2/2009 | Zafrani | |
| 7,564,147 B2 | 7/2009 | Michalko | |
| 7,609,492 B2 | 10/2009 | Maier | |
| 7,626,797 B2 | 12/2009 | Kilroy et al. | |
| 7,656,633 B2 | 2/2010 | Kilroy et al. | |
| 7,656,634 B2 | 2/2010 | Robertson et al. | |
| 2003/0197993 A1 * | 10/2003 | Mirowski et al. | 361/93.2 |
| 2008/0217471 A1 | 9/2008 | Liu et al. | |

OTHER PUBLICATIONS

More Electric Aircraft Forum: Standardizing Solid State Electric Distribution Components for a Greener and Cheaper Aircraft; Author: Dominique-Robert Meux and Dominique Girot; 2009 MOET.

* cited by examiner

*Primary Examiner* — Robert L. Deberadinis
(74) *Attorney, Agent, or Firm* — Carlson, Gaskey & Olds, PC

(57) ABSTRACT

A power distribution module has an input line to receive power from a DC power source. A switch selectively opens the input line and blocks supply of power from the input line to an output line to be connected to a DC load. A solid state power control controls a gate drive for the switch. The solid state power control is operable to distinguish between a precharge mode, at which current is rushing to supply a capacitor in the downstream DC load, and a short circuit mode, at which a short circuit exists.

18 Claims, 2 Drawing Sheets

SSPC WITH ACTIVE CURRENT LIMITING

BACKGROUND OF THE INVENTION

This application relates to a solid state power controller where an inrush current is categorized, and addressed.

Power distribution systems are utilized to control the flow of power from a common source, such as a power bus, to a plurality of components. Typically, circuit breakers are included along with controllers to control the amount of power flowing from the bus to any one device. One common application for such systems is in the provision of electrical power access for an aircraft, and its several components.

Historically, electromechanical circuit breakers have been utilized. Electromechanical circuit breakers had some deficiencies in that they could suffer degradation during repeated fault isolation. Further, they were relatively heavy and large.

More recently, solid state power controllers (SSPCs) have been utilized to replace the electromechanical circuit breakers. The switching device within an SSPC may dissipate excessive heat at elevated current levels due to internal resistances. Thus, SSPCs do raise some challenges.

Further, the SSPC may be subject to a large inrush current during channel closure, such as when supplying power to a storage capacitor in a downstream DC load. This inrush current may adversely effect power quality on the DC bus.

SUMMARY OF THE INVENTION

A power distribution module has an input line to receive power from a DC power source. A switch selectively opens the input line and blocks supply of power from the input line to an output line to be connected to a DC load. A solid state power control controls a gate drive for the switch. The solid state power control is operable to distinguish between a pre-charge mode, at which current is rushing to supply a capacitor in the downstream DC load, and a short circuit mode, at which a short circuit exists on the system.

These and other features of the present invention can be best understood from the following specification and drawings, the following of which is a brief description.

DETAILED DESCRIPTION OF THE PREFERRED EMBODIMENT

Figure 1:
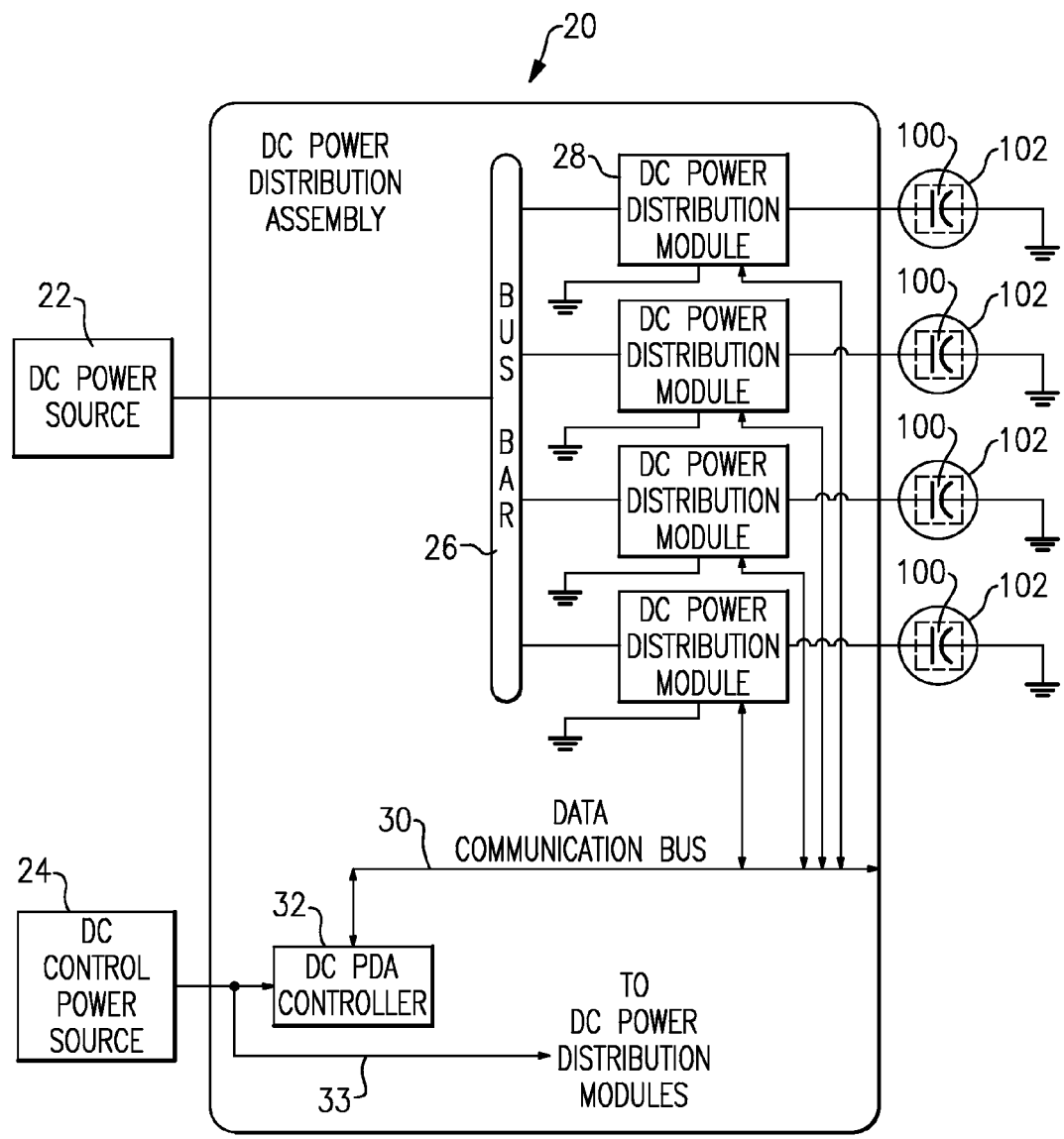
FIG. 1 shows a system architecture.

An electrical system architecture 20 such as may be utilized on an aircraft is shown in FIG. 1. System architecture 20 may receive DC power from a DC power source 22. The DC power source 22 may be a turbine system providing alternating current through an inverter to provide DC power to a DC bus bar 26. The DC bus bar 26 communicates to a plurality of DC power distribution modules 28. DC loads 102, such as motors, etc., are positioned downstream of the DC power distribution modules 28. A DC control power source 24 supplies power to a DC power distribution assembly (PDA) controller 32, which receives and sends signals to a data communication bus 30. The data communication bus 30 communicates with each of the DC power distribution modules 28. In addition, DC power may be supplied on a line 33 from DC control power source 24 to each of the DC power distribution modules 28.

Figure 2:
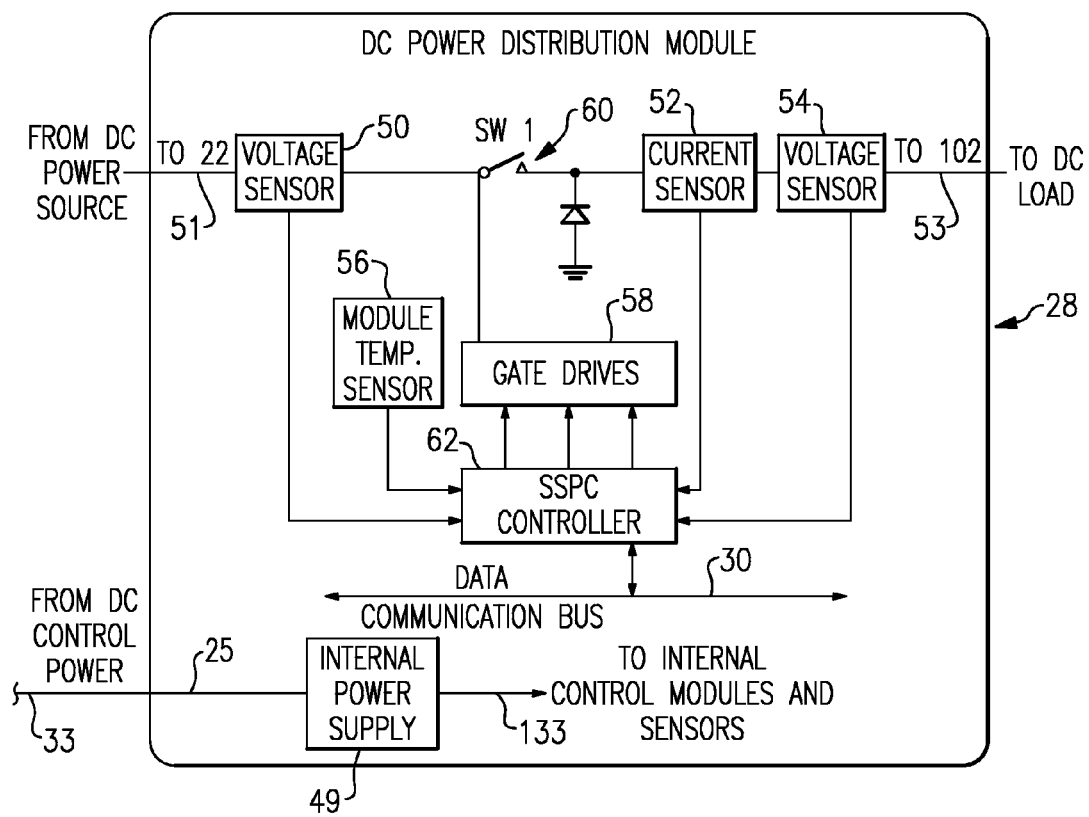
FIG. 2 shows a power distribution module.

Each of the power distribution modules 28 may be structured as shown in FIG. 2. As shown, a line from the DC power source 22 supplies DC power through a switch 60. Gate drive 58 opens and closes the switch 60 in response to sensed signals.

An input line 51 leads into the power distribution module 28, and through a voltage sensor 50. Voltage sensor 50 is intended to ensure that the supplied voltage is within a range of acceptable voltages prior to the switch 60 being closed. As such, it acts as a safety item.

A current sensor 52 senses a current ($I_{DC\_LOAD}$) while a voltage sensor 54 senses a voltage ($V_{DC\_LOAD}$) heading to the DC loads 102. The output of the voltage sensor is line 53, which leads to the DC load 102.

Further, the line 33 passes through an internal power supply 49, which effectively acts as a transformer to reduce the voltage put onto an output line 133 leading to internal control modules and sensors within the power distribution module 28.

The outputs of voltage sensor 50, current sensor 52, and voltage sensor 54 are all sent to a solid state power control (SSPC) controller 62. The SSPC controller 62 may be any appropriate device that is capable of taking in signals, and providing output signals to the gate drive 58 to control the switch 60. For example, the SSPC controller 62 can include one or more programmable logic devices, application specific integrated circuits, digital signal processors, and/or microcontrollers.

A temperature sensor 56 is also provided for known temperature protection, as may be known in SSPCs.

The DC power distribution module 28 is capable of distinguishing between normal operation, a pre-charge mode, and a short circuit mode with respect to voltage and current supplied to DC loads 102. During a pre-charge mode, the SSPC controller 62 controls operation of the switch 60 to allow gradual provision of inrush current to a capacitor 100 that may be found in each of the DC loads 102. The capacitors 100 are shown schematically in FIG. 1, as are the DC loads 102. The capacitors 100 are typically charged at initial system start-up.

A pre-charge mode is determined when the value of $V_{DC\_LOAD} > V_{THR}$; and $I_{DC\_LOAD} > I_{THR}$.

$V_{THR}$ and $I_{THR}$ are threshold voltage and current, respectively, which may be determined to be indicative of a pre-charge mode. During a pre-charge mode, it would be expected that both the voltage and the current would be relatively large, and above the thresholds.

On the other hand, a short circuit mode can be identified when $V_{DC\_LOAD} < V_{THR}$; and $I_{DC\_LOAD} > I_{THR}$.

A short circuit would be indicative of this voltage and current as being sensed at the location of the sensors 52 and 54.

Normal mode would typically be when $V_{DC\_LOAD} > V_{THR}$ and $I_{DC\_LOAD} < I_{THR}$.

When the SSPC controller 62 detects a pre-charge mode, then pulse width modulation is utilized to control the opening and closing of the switch 60 using gate drive 58, with an increasing variable duty cycle until $V_{DC\_LOAD}$ reaches a pre-determined value. At this point, the switch 60 may be fully closed. In this way, the inrush current is limited as the capacitor 100 is charged over time without the passage of the large current spike as an immediate impact into the system.

During short circuit mode, the SSPC controller 62 enables pulse width modulation control of the switch 60 with a duty cycle responsive to the current limiting value so that the $I_{DC\_LOAD}$ is maintained approximately equal to a limiting value ($I_{DC\_LIMIT}$). Again, the value for $I_{DC\_LIMIT}$ may be selected to be appropriate for the particular system. After a predetermined period of time, the switch 60 is fully opened and a fault status can be announced.

During normal system conditions, the switch 60 is closed.

The above-described system improves power quality on the DC bus 26 during both pre-charge mode, and short circuit mode, while protecting the interconnect apparatus and its several components.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A power distribution module comprising:
an input line to receive power from a DC power source;
a switch for selectively opening said input line and blocking supply of power from said input line to an output line to be connected to a DC load;
a solid state power control configured to control a drive for said switch, said solid state power control being operable to distinguish between a pre-charge mode, at which current is rushing to supply a capacitor in the DC load, and a short circuit mode, at which a short circuit exists; and
said solid state power control having a first mode of operation when the pre-charge mode is detected, and a second mode of operation when the short circuit mode is detected, and a third mode of operation under normal conditions, said first mode of operation includes said solid state power control enabling pulse width modulation of said switch, said pulse width modulation operating with an increasing variable duty cycle until a sensed voltage reaches a predetermined value.

2. The power distribution module as set forth in claim 1, wherein said sensed voltage and a sensed current are sensed between the input line and the output line, and the combination of said sensed current and said sensed voltage is utilized to determine which of the three modes of operation is appropriate.

3. The power distribution module as set forth in claim 2, wherein said sensed voltage is compared to a threshold voltage, and said sensed current is compared to a threshold current to make said determination.

4. The power distribution module as set forth in claim 3, wherein if said sensed voltage is above said threshold voltage, and said sensed current is above said current threshold, then a determination is made that said first mode is appropriate;
and if said sensed voltage is below said voltage threshold, and said sensed current is above said current threshold, then a determination is made that said second mode is appropriate.

5. The power distribution module as set forth in claim 4, wherein if said sensed voltage is above said voltage threshold and said sensed current is below said current threshold, then a determination is made that said third mode of operation is appropriate.

6. The power distribution module as set forth in claim 2, wherein said solid state power controller utilizes pulse width modulation to control said switch during said second mode.

7. The power distribution module as set forth in claim 6, wherein said pulse width modulation duty cycle is controlled based upon said sensed current, and comparison to a limiting value, and after a period of time said switch is fully opened.

8. The power distribution module as set forth in claim 1, wherein once said predetermined value is reached, then said switch is fully closed.

9. The power distribution module as set forth in claim 1, wherein a safety voltage sensor is positioned upstream of said switch on said input line to ensure that a supplied voltage is within an acceptable range prior to said switch being closed.

10. The power distribution module as set forth in claim 1 wherein a current and the sensed voltage heading downstream to a load are sensed, and the pre-charge mode is detected if the sensed voltage exceeds a threshold and the sensed current exceeds a threshold, and the short circuit mode is detected when the sensed voltage is less than said threshold, and the sensed current is greater than said sensed threshold.

11. A power architecture comprising:
a DC power bus;
said DC power bus communicating with a plurality of DC power distribution modules, and there being a plurality of loads receiving power from said DC power distribution modules, with at least some of said loads including a capacitor; and
said DC power distribution modules each having an input line to receive power from said DC power bus, a switch configured to selectively open said input line and block supply of power from said input line to an output line to be connected to at least one of said loads, a solid state power control configured to control a gate drive for said switch, said solid state power control being operable to distinguish between a pre-charge mode, at which current is rushing to supply said capacitor in said at least one of said loads, and a short circuit mode, at which a short circuit exists;
said solid state power control having a first mode of operation when said pre-charge mode is detected, and a second mode of operation when said short circuit mode is detected, and a third mode of operation under normal conditions, said first mode of operation includes said solid state power control enabling pulse width modulation of said switch, said pulse width modulation operating with an increasing variable duty cycle until a sensed voltage reaches a predetermined value.

12. The power architecture as set forth in claim 11, wherein a voltage and current is sensed between said switch and the output line, and the combination of said sensed current and said sensed voltage is utilized to determine which of the three modes of operation is appropriate, said sensed voltage is compared to a threshold voltage, and said sensed current is compared to a threshold current to make said determination, and wherein if said sensed voltage is above said threshold voltage, and said sensed current is above said current threshold, then a determination is made that said first mode is appropriate, and if said sensed voltage is below said voltage threshold, and said sensed current is above said current threshold, then a determination is made that said second mode is appropriate.

13. The power architecture as set forth in claim 11, wherein said first and second modes of operation include said solid state power control enabling pulse width modulation of said switch.

14. The power architecture as set forth in claim 11, wherein a safety voltage sensor is positioned upstream of said switch on said input line to ensure that a supplied voltage is within an acceptable range prior to said switch being closed.

15. The power architecture as set forth in claim 11, wherein once said predetermined value is reached, then said switch is fully closed.

16. The power architecture as set forth in claim 15, wherein the current and voltage heading downstream to a load are sensed, and the pre-charge mode is detected if the sensed voltage exceeds a threshold and the sensed current exceeds a threshold, and the short circuit mode is detected when the sensed voltage is less than said threshold, and the sensed current is greater than said sensed threshold.

17. A method of operating a power distribution module comprising the steps of:
(a) selectively providing a switch on an input line for blocking supply of power from said input line to an output line connected to a DC load; and
(b) sensing current and voltage and distinguishing between a pre-charge mode, at which current is rushing to supply a capacitor in the DC load, and a short circuit mode, at which a short circuit exists, and using pulse width modulation to control the switch opening in said pre-charge mode and said short circuit mode, and in a pre-charge mode, utilizing said pulse width modulation with an increasing variable duty cycle until the sensed voltage reaches a predetermined value, and then said switch is fully closed.

18. The method as set forth in claim 17, wherein the sensed current and the voltage sensed heading downstream to a load, and the pre-charge mode is detected if the sensed voltage exceeds a threshold and the sensed current exceeds a threshold, and the short circuit mode is detected when the sensed voltage is less than said threshold, and the sensed current is greater than said sensed threshold.

* * * * *